US012368263B2

(12) United States Patent
Liu

(10) Patent No.: US 12,368,263 B2
(45) Date of Patent: Jul. 22, 2025

(54) ELECTRICAL CONNECTOR FOR USE IN CHRISTMAS TREE

(71) Applicant: Silver Beauty Electronic and Lighting Co., Ltd, HeShan (CN)

(72) Inventor: Huawang Liu, HeShan (CN)

( * ) Notice: Subject to any disclaimer, the term of this patent is extended or adjusted under 35 U.S.C. 154(b) by 330 days.

(21) Appl. No.: 18/298,865

(22) Filed: Apr. 11, 2023

(65) Prior Publication Data

US 2024/0097371 A1 Mar. 21, 2024

(30) Foreign Application Priority Data

Sep. 21, 2022 (CN) ......................... 202222522061.7

(51) Int. Cl.
*H01R 13/453* (2006.01)
*H01R 13/502* (2006.01)

(52) U.S. Cl.
CPC ......... *H01R 13/453* (2013.01); *H01R 13/502* (2013.01)

(58) Field of Classification Search
CPC .... H01R 13/453; H01R 13/502; H01R 33/05; A47G 33/06; A47G 2033/0827; F21S 4/10
See application file for complete search history.

(56) References Cited

U.S. PATENT DOCUMENTS

| | | | | |
|---|---|---|---|---|
| 8,753,152 B1 * | 6/2014 | Tsai | .................. | H01R 13/6633 362/202 |
| 9,184,539 B1 * | 11/2015 | Tsai | .................. | H01R 13/6633 |
| 9,362,657 B1 * | 6/2016 | Yang | .................. | F21S 4/10 |
| 10,128,613 B2 * | 11/2018 | Yang | .................. | H01R 24/28 |
| 2017/0125945 A1 * | 5/2017 | Ping | .................. | H01R 13/631 |
| 2018/0131129 A1 * | 5/2018 | Plested | .................. | H01R 43/26 |
| 2022/0395126 A1 * | 12/2022 | Leung | .................. | F16B 7/149 |
| 2024/0097371 A1 * | 3/2024 | Liu | .................. | H01R 13/502 |
| 2024/0097373 A1 * | 3/2024 | Liu | .................. | H01R 13/625 |

* cited by examiner

*Primary Examiner* — Abdullah A Riyami
*Assistant Examiner* — Nader J Alhawamdeh
(74) *Attorney, Agent, or Firm* — Novoclaims Patent Services LLC; Mei Lin Wong

(57) ABSTRACT

An electrical connector includes a first electrical connector body, a second electrical connector body, a first outer connector and a second outer connector. The first electrical connector body includes an insulating isolation ring, a negative terminal connector and a live terminal connector mounted on two opposite sides of the insulating isolation ring, an insulating protective ring mounted inside the first electrical connector body and the insulating isolation ring, an annular negative terminal, an insulating spring accommodated in the annular negative terminal, and an annular positive terminal received in the annular negative terminal and physically separated by the insulating spring. The second electrical connector body includes a connecting member, a connecting column, a negative terminal member and a live terminal member. The first electrical connector body is detachably connected to the second electrical connector body such that the annular negative terminal is physically separated from the annular positive terminal.

20 Claims, 7 Drawing Sheets

ELECTRICAL CONNECTOR FOR USE IN CHRISTMAS TREE

CROSS REFERENCE OF RELATED APPLICATION

This is a non-provisional application that claims priority to Chinese application number 202222522061.7, filing date Sep. 21, 2022, the entire contents of each of which are expressly incorporated herein by reference.

BACKGROUND OF THE PRESENT INVENTION

Field of Invention

The present invention relates to an electrical connector, and more particularly to an electrical connector for use on a Christmas tree, wherein the electrical connector can be conveniently and rapidly assembled and disassembled in a safe manner.

Description of Related Arts

Artificial Christmas trees have widely been used for celebrating Christmas. People have decorated artificial Christmas trees by using a wide variety of illuminating devices. Those illuminating devices may generate illumination of different colors and patterns. Conventional illuminating devices for Christmas tree, such as artificial Christmas tree may comprise a plurality of illuminators connected by flexible cables. The flexible cables may be attached on different branches of the Christmas tree so as to allow the entire Christmas tree to have illuminating effect.

As to the electrical connections of these illuminating devices, there exist broadly two types of connecting assembling. The first type of connecting assemblies usually comprises a first connector and a second electrical connector body detachably connected to each other. Each of the first connector and the second electrical connector body may be connected to a certain number of illuminators and is usually attached on the Christmas tree and exposed to ambient environment. The disadvantage of this type of connecting assemblies is that a user may accidentally come into contact with the electrical terminals provided on the first connector and the second electrical connector body and this poses electrical hazard to users who are decorating the Christmas tree or even to children who accidentally detach the first and the second electrical connector body due to curiosity.

The second type of connecting assemblies usually comprises a socket body having both a positive terminal and a negative terminal. The problem with this type of connecting assemblies is that it poses a substantial risk of electrical hazards. For example, of small metallic objects, such as small screw, are accidentally disposed in the socket body and come into contact with both the positive terminal and the negative terminal, short circuit may occur, and this may in turn cause fire from the socket body.

As a result, there is a need to develop an electrical connector which is safe and convenient for use in Christmas trees, such as artificial Christmas trees.

SUMMARY OF THE PRESENT INVENTION

An objective of the present invention is to provide an electrical connector for use on a Christmas tree, wherein the electrical connector can be conveniently and rapidly assembled and disassembled in a safe manner.

In one aspect of the present invention, it provides an electrical connector for a Christmas tree having a hollow tube structure, comprising:

- a first electrical connector body having an outer wall, a receiving cavity and an end plate to form a substantially tubular structure, and comprising:
- an insulating isolation ring provided in the receiving cavity of the first electrical connector body;
- a negative terminal connector and a live terminal connector mounted on the end plate of the first electrical connector;
- an insulating protective ring mounted in the receiving cavity at a position between the outer wall of the first electrical connector body and the insulating isolation ring;
- an annular negative terminal received in the receiving cavity of the first electrical connector body;
- an annular spring holder having a first positioning slot;
- an insulating spring having one end secured in the first positioning slot of the annular spring holder, the insulating spring accommodating in the annular negative terminal; and
- an annular positive terminal received in the annular negative terminal and physically separated by the insulating spring in the annular negative terminal;
- a second electrical connector body detachably connected to the first connector at the first opening thereof, the second electrical connector body comprising:
- a connecting member;
- a connecting column having a securing slot and extending from the connecting member;
- a negative terminal member mounted on the connecting member;
- a live terminal member mounted on the connecting member;
- a neutral terminal member provided on the connecting member;
- a neutral conductive column electrically connected to the neutral terminal member;
- a first outer connector connected to the first electrical connector body at a position opposite to the second electrical connector body, the first outer connector connecting to the Christmas tree; and
- a second outer connector connected to the second electrical connector body at a position opposite to the first electrical connector body, the second outer connector connecting to the Christmas tree, wherein when the first electrical connector body is detachably connected to the second electrical connector body, the negative terminal connector and the live terminal connector of the first electrical connector body are arranged to electrically connect to the annular negative terminal and annular positive terminal respectively, the other end of the annular negative terminal and annular positive terminal are connected to the negative terminal member and the live terminal member of the second electrical connector body respectively, one end of the neutral conductive column is connected to the neutral terminal member of the second electrical connector body, and its other end penetrates out of the first electrical connector, and this end is grounded.

This summary presented above is provided merely to introduce certain concepts and not to identify any key or essential features of the claimed subject matter.

DETAILED DESCRIPTION OF THE PREFERRED EMBODIMENT

Figure 1:
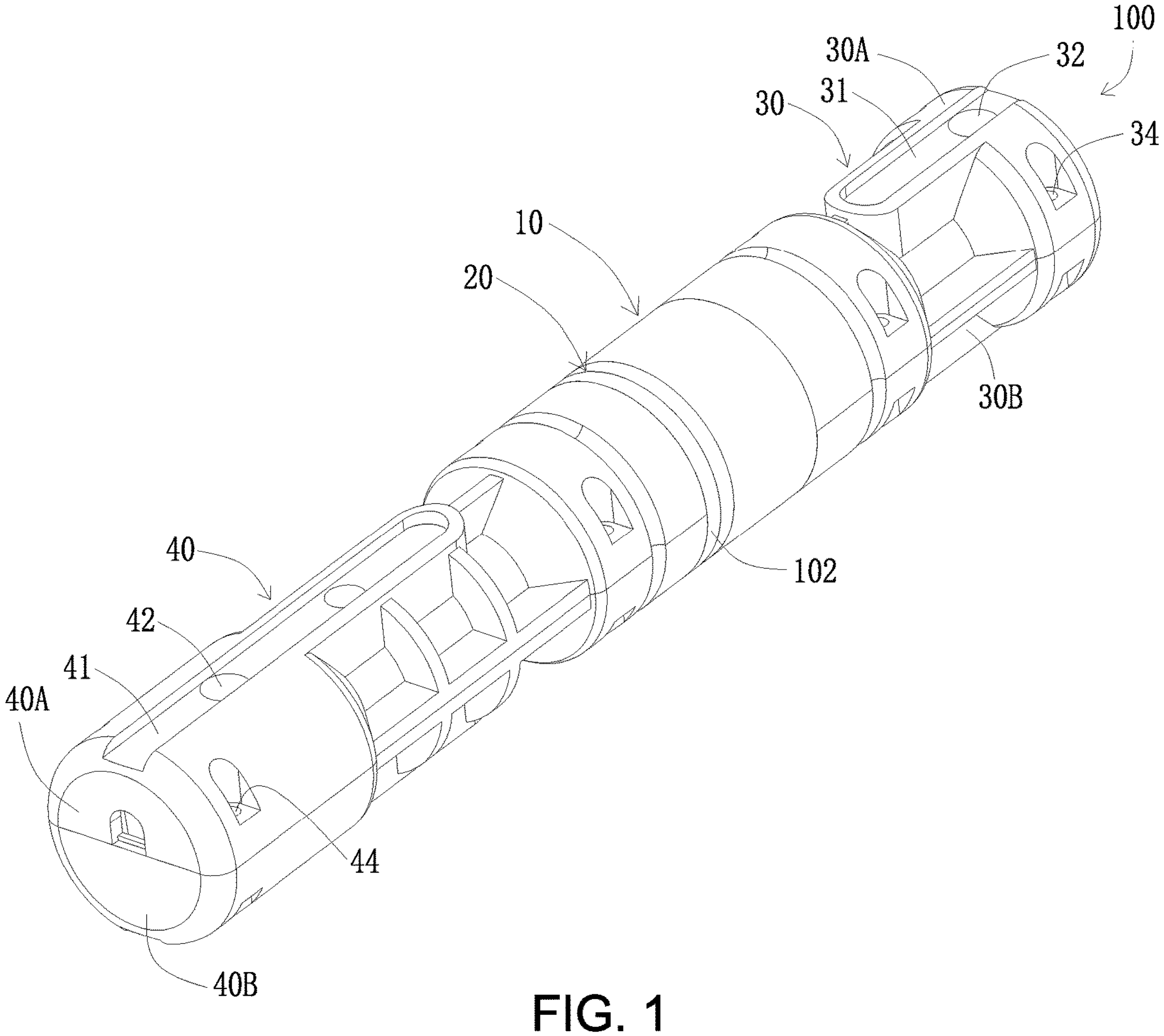
FIG. 1 is a perspective view of an electrical connector according to a preferred embodiment of the present invention.
Figure 2:
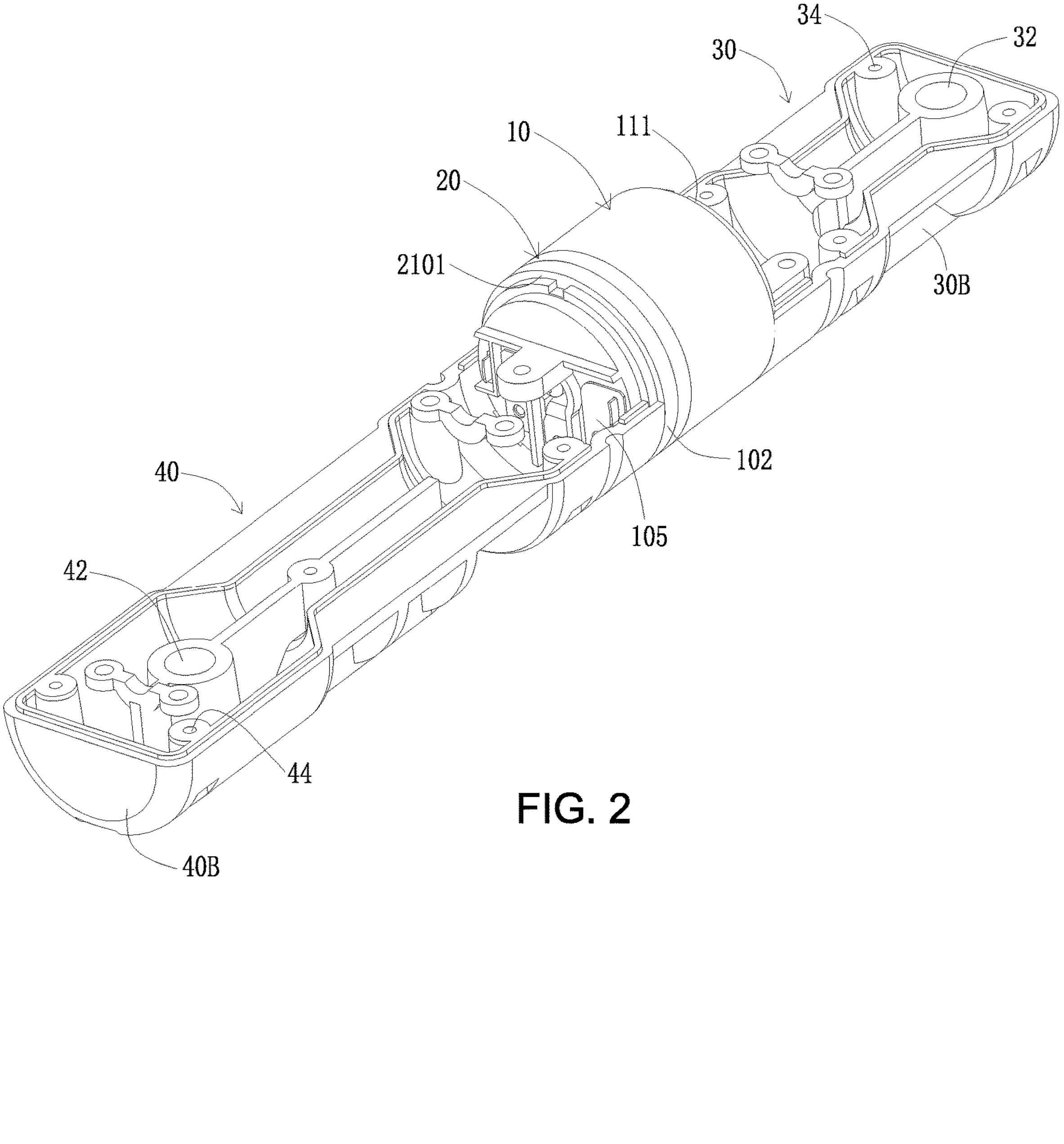
FIG. 2 is a schematic diagram of the electrical connector according to the preferred embodiment of the present invention, illustrating the internal structure of a first outer connector and a second outer connector.
Figure 3:
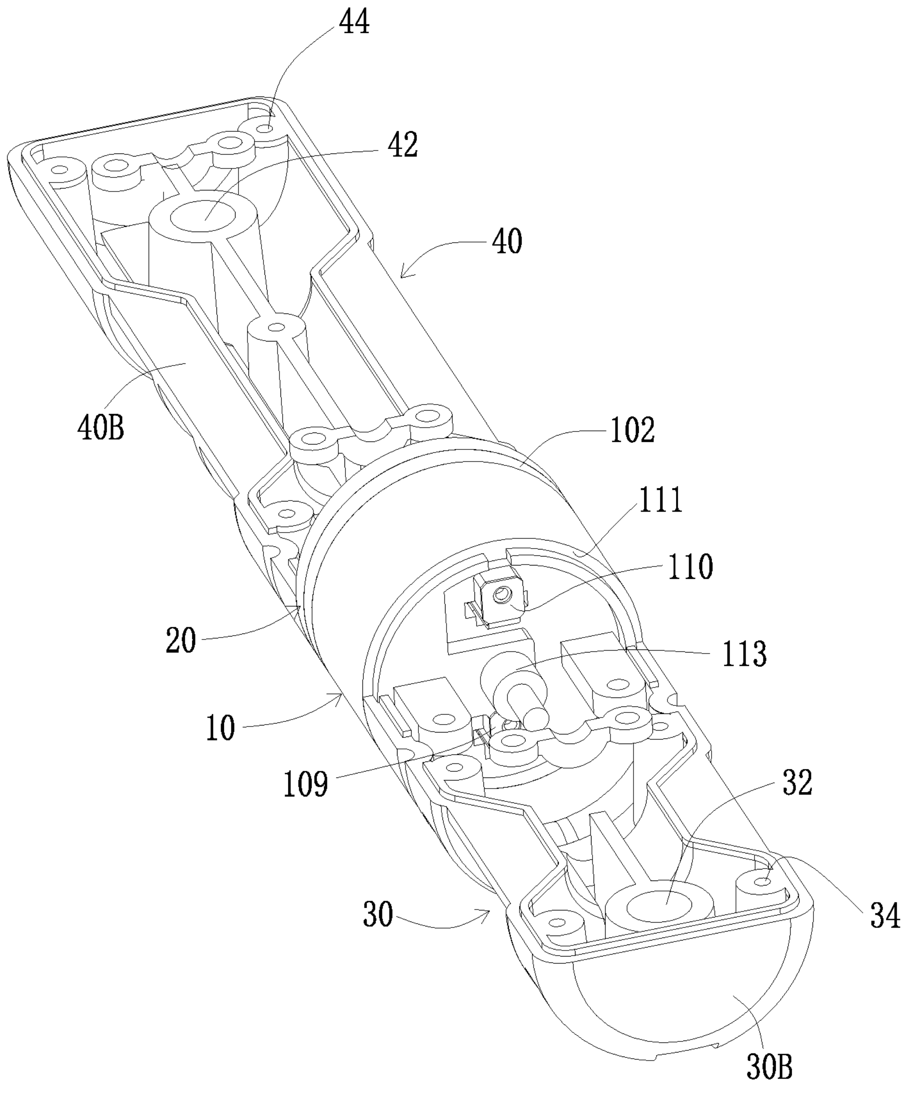
FIG. 3 is another schematic diagram of the electrical connector according to the preferred embodiment of the present invention, illustrating the internal structure of the first outer connector and the second outer connector.

The following detailed description of the preferred embodiment is the preferred mode of carrying out the invention. The description is not to be taken in any limiting sense. It is presented for the purpose of illustrating the general principles of the present invention.

It should be appreciated that the terms “install”, “connect”, “couple”, and “mount” in the following description refer to the connecting relationship in the accompanying drawings for easy understanding of the present invention. For example, the connection can refer to permanent connection or detachable connection. Furthermore, “connected” may also mean direct connection or indirect connection, or connection through other auxiliary components. Therefore, the above terms should not be an actual connection limitation of the elements of the present invention.

It should be appreciated that the terms “length”, “width”, “top”, “bottom”, “front”, “rear”, “left”, “right”, vertical”, “horizontal”, “upper”, “lower”, “exterior”, and “interior” in the following description refer to the orientation or positioning relationship in the accompanying drawings for easy understanding of the present invention without limiting the actual location or orientation of the present invention. Therefore, the above terms should not be an actual location limitation of the elements of the present invention.

It should be appreciated that the terms “first”, “second”, “one”, “a”, and “an” in the following description refer to “at least one” or “one or more” in the embodiment. In particular, the term “a” in one embodiment may refer to “one” while in another embodiment may refer to “more than one”. Therefore, the above terms should not be an actual numerical limitation of the elements of the present invention.

Referring to FIG. 1 to FIG. 7 of the drawings, an electrical connector 100 for use on a Christmas tree according to preferred embodiment of the present invention is illustrated. Broadly, the electrical connector comprises a first electrical connector body 10, a second electrical connector body 20, a first outer connector 30, and a second outer connector 40.

The first electrical connector body 10, the second electrical connector body 20, the first outer connector 30, and the second outer connector 40 are coaxially arranged to form an elongated structure. The first electrical connector body 10 is detachably connected to the second electrical connector body 20. The first outer connector 30 is detachably connected to the first electrical connector body 10 at a position opposite to the second electrical connector body 20. Similarly, the second outer connector 40 is detachably connected to the second electrical connector body 20 at a position opposite to the first electrical connector body 10.

Thus, as shown in FIG. 1 of the drawings, the first outer connector 30, the first electrical connector body 10, the second electrical connector body 20 and the second outer connector 40 are sequentially arranged along a longitudinal axis of the electrical connector 100 of the present invention. The electrical connector 100 may be installed and received within a hollow cavity of a tubular structure of a Christmas tree, such as a branch of an artificial Christmas tree. More specifically, the first outer connector 30 and the second outer connector 40 are connected to the Christmas tree so as to be accessible from two ends of the corresponding tubular structure of the artificial Christmas tree.

The first electrical connector body 10 may be configured from electrical insulating material, such as plastic material, and may have a tubular structure having a receiving cavity 1029 formed therein. According to the preferred embodiment of the present invention, the first electrical connector body 10 further have a first opening 1031 and an end plate 112 formed on two ends thereof respectively, wherein a receiving cavity 1029 is formed in a space between the first opening 1031 and the end plate 112. Moreover, the first electrical connector body 10 further has a first connecting rim 111, in which the first outer connector 30 is detachably connected to the first electrical connector body 10 through the first connecting rim 111.

Figure 5:
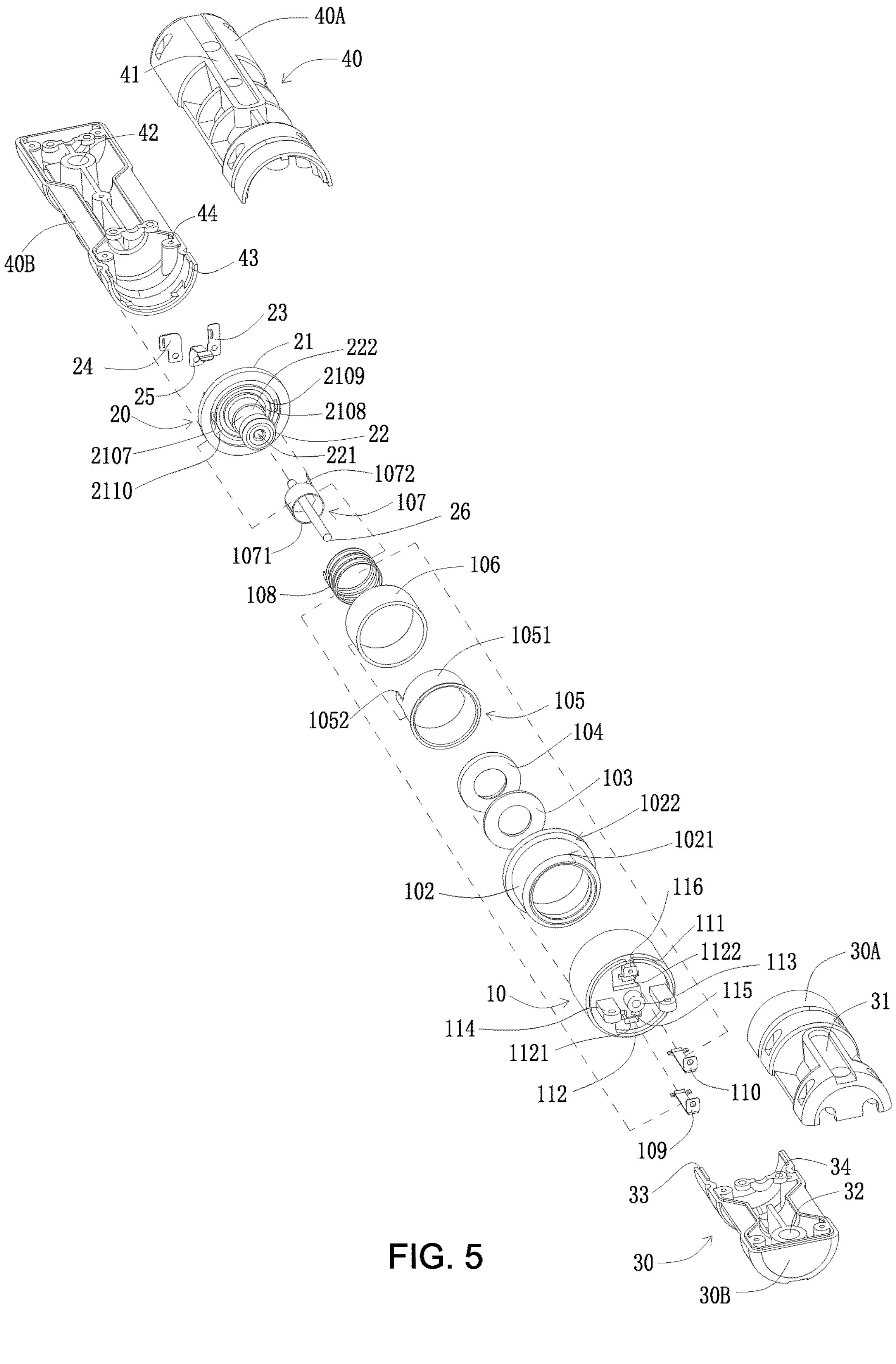
FIG. 5 is another exploded perspective view of the electrical connector according to the preferred embodiment of the present invention.
Figure 6:
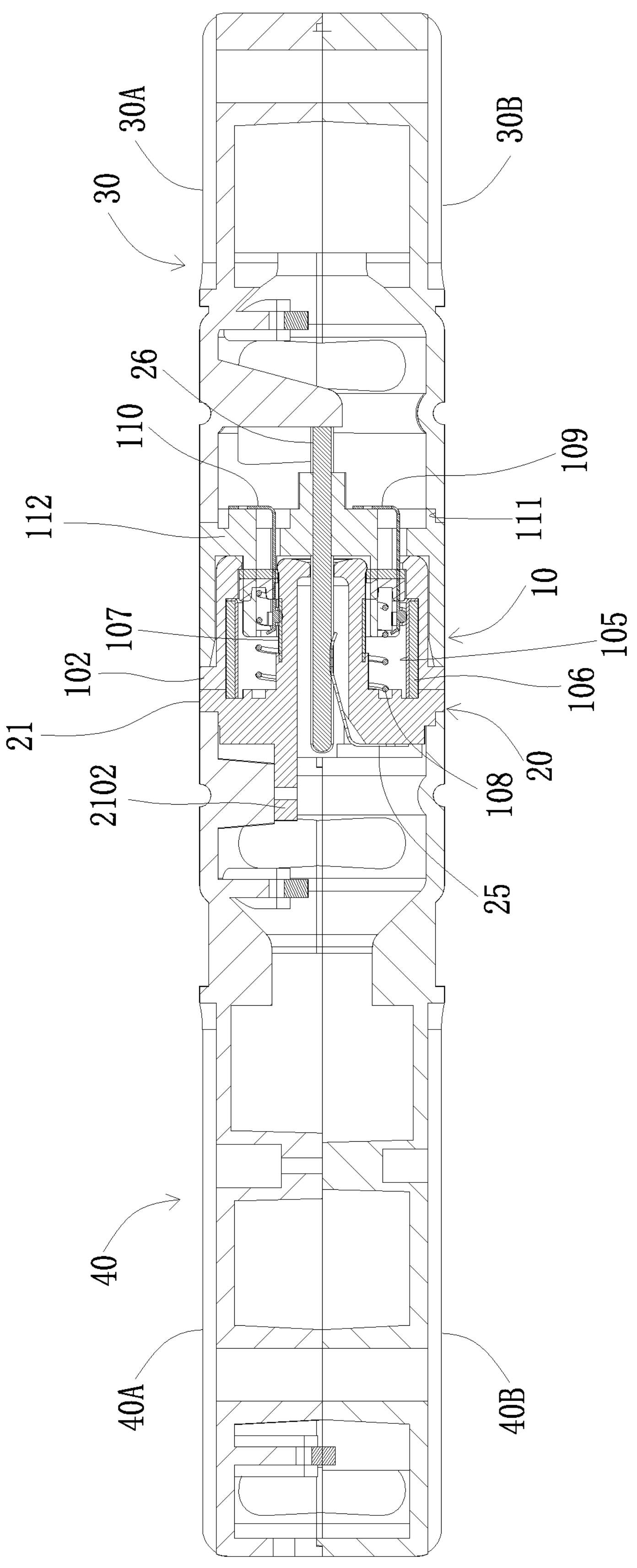
FIG. 6 is a sectional side view of the electrical connector according to the preferred embodiment of the present invention.
Figure 7:
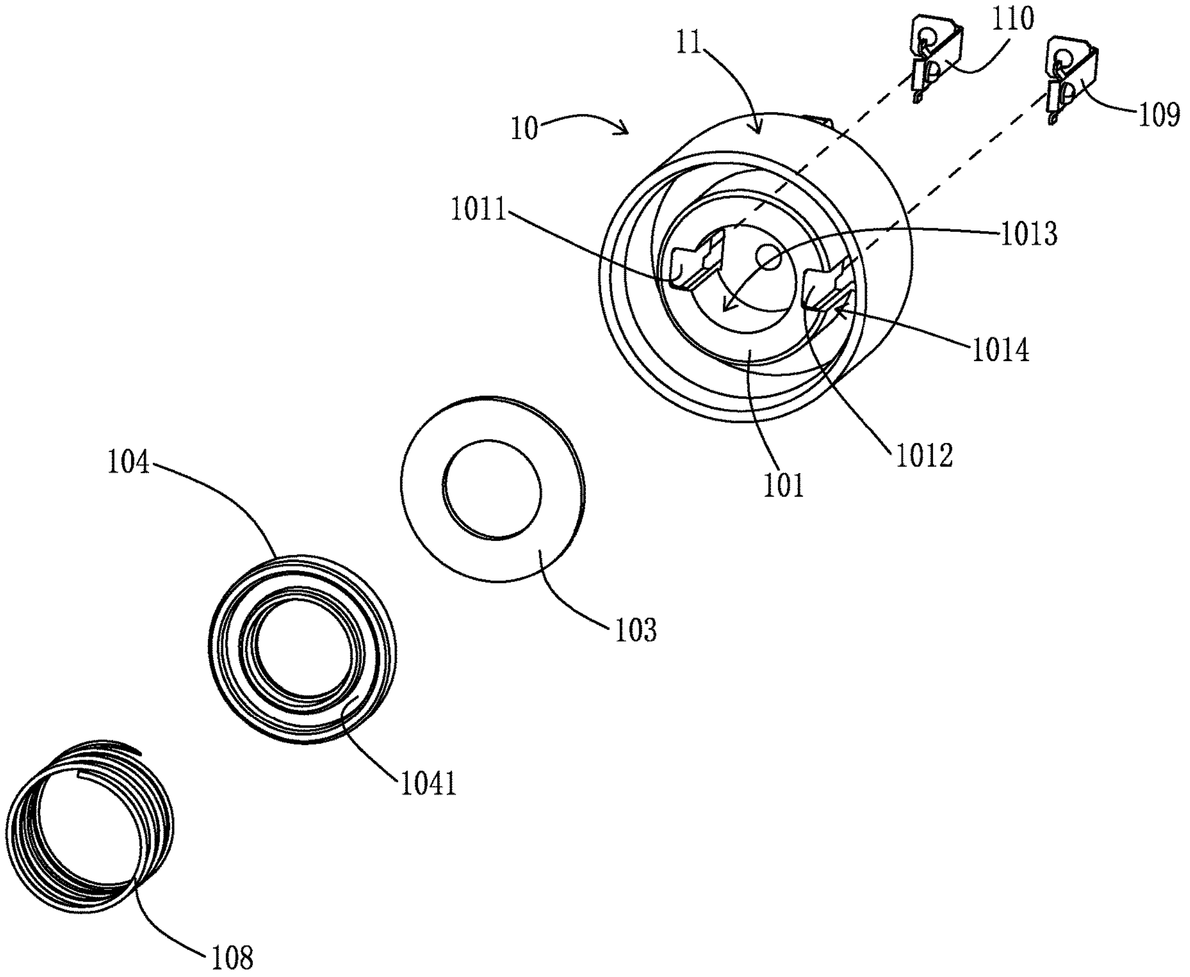
FIG. 7 is a perspective view of a first electrical connector body of the electrical connector according to the preferred embodiment of the present invention.

As shown in FIGS. 1-7 of the drawings, the first electrical connector body 10 further comprise an insulating isolation ring 101 formed in the receiving cavity 1029. According to the preferred embodiment of the present invention, the insulating isolation ring 101 may integrally extend from the end plate 112 toward the first opening 1031. The insulating isolation ring 101 may have a tubular structure and a circular cross sectional shaped when viewed from longitudinal direction of the first electrical connector body 10. As shown in FIG. 7 of the drawings, an outer wall 11 of the first electrical connector body 10 and the insulating isolation ring 101 are concentrically and spacedly arranged in the receiving cavity 1029.

The first electrical connector body 10 further comprises a negative terminal connector 109 and a live terminal connector 110 mounted on the insulating isolation ring 101 at two opposite sides thereof. Thus, the negative terminal connector 109 and the live terminal connector 110 may be securely separated by the insulating isolation ring 101.

More specifically, the insulating isolation ring 101 may have a first guiding slot 1011 and a second guiding slot 1012 formed on an inner surface 1013 and an outer surface 1014 of the insulating isolation ring 101 at two opposite sides thereof respectively. The first guiding slot 1011 and the second guiding slot 1012 may extend on the insulating isolation ring 101 in the receiving cavity 1029 and reach the end plate 112. The end plate 112 may have a plurality of through holes 1121, 1122 formed thereon for communicating with the first guiding slot 1011 and the second guiding slot 1012 respectively.

As shown in FIGS. 1-7 of the drawings, the negative terminal connector 109 may have a first longitudinal portion 1091 and a first transverse portion 1092 to form an L-shaped structure, wherein the first longitudinal portion 1091 may be mounted on the first guiding slot 1011 and penetrate through the corresponding hole 1121, while the first transverse portion 1092 may be mounted on an outer surface 1121 of the end plate 112.

The live terminal connector 110 may have a second longitudinal portion 1101 and a second transverse portion 1102 to form an L-shaped structure, wherein the second longitudinal portion 1101 may be mounted on the second guiding slot 1012 and penetrate through the corresponding hole 1122, while the second transverse portion 1102 may also be mounted on an outer surface 1121 of the end plate 112.

The first electrical connector body 10 further comprises an insulating protective ring 102 mounted in the receiving cavity 1029 at a position between the outer wall 11 of the first electrical connector body 10 and the insulating isolation ring 101. As shown in FIG. 5 of the drawings, the insulating protective ring 102 may have a tubular structure and may have a peripheral rim portion 1021 and a main portion 1022 extending from the peripheral rim portion 1022. The peripheral rim portion 1021 is to be mounted on the first opening 1031 of the first electrical connector body 10, while the main portion 1022 extends in the receiving cavity 1029 toward the end plate 112. The insulating protective ring 102 is configured from electrical insulating material and provides shock protection for the negative terminal connector 109 and the live terminal connector 110.

The first electrical connector body 10 further comprises a protection ring 103, an annular spring holder 104, and an annular negative terminal 105. Each of the protection ring 103, the annular spring holder 104 and the annular negative terminal 105 is configured as having a ring structure and is received in the first electrical connector body 10.

The protection ring 103 is configured from electrically insulating material and is mounted on a front surface of the insulating isolation ring 101 for preventing unwanted objects from accidentally entering to the receiving cavity 1029. The annular spring holder 104 is also configured from electrically insulating material and has a first positioning slot 1041 circumferentially formed thereon.

The first electrical connector body 10 further comprises an insulating spring 108, wherein the annular spring holder 104 is provided adjacent to the protection ring 103 for securing a position of the insulating spring 108 through mounting one end of the insulating spring 108 in the first positioning slot 1041.

Figure 4:
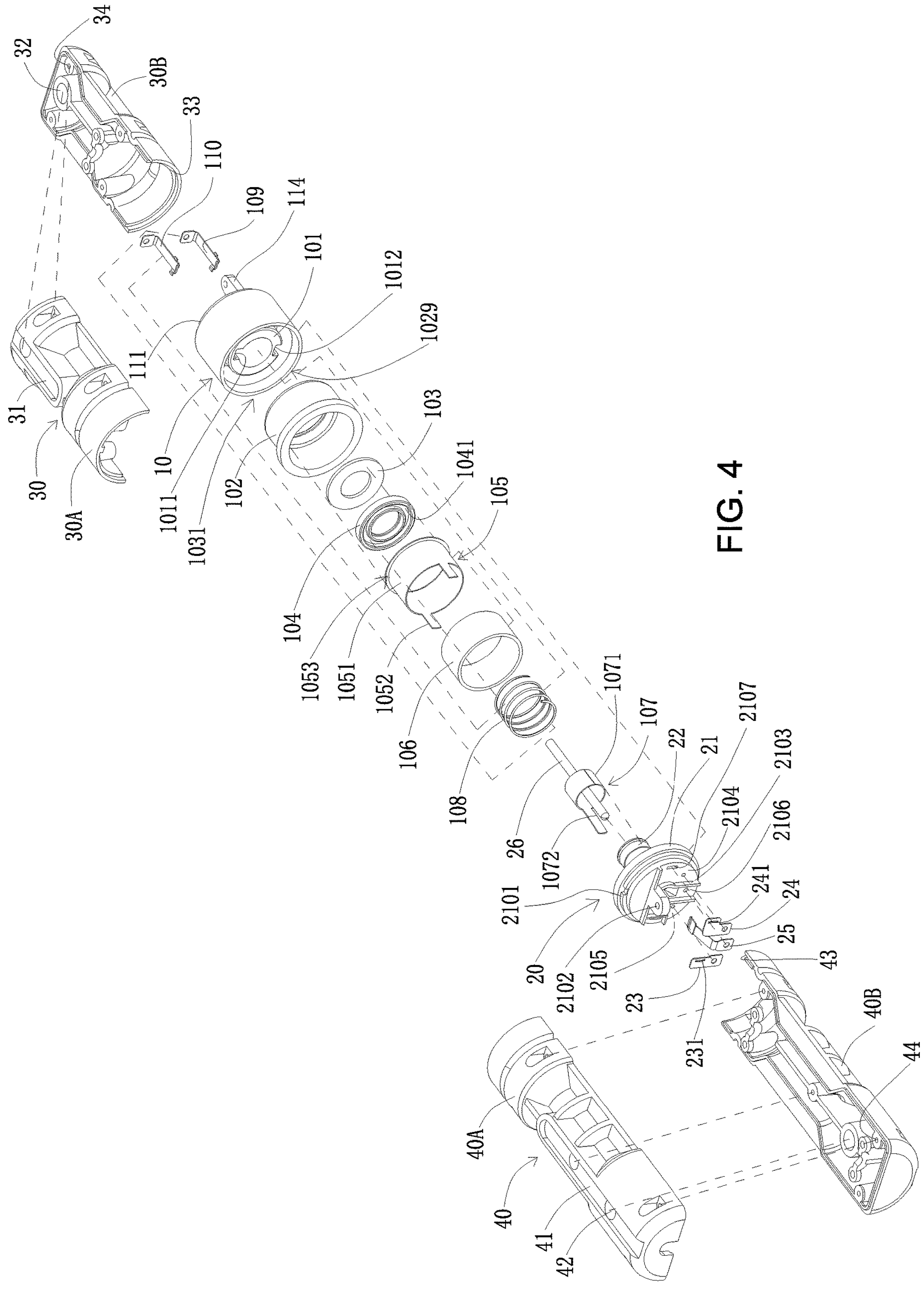
FIG. 4 is an exploded perspective view of the electrical connector according to the preferred embodiment of the present invention.

As shown in FIG. 4 of the drawings, the annular negative terminal 105 is configured from electrically conductive material and comprise an annular negative terminal body 1051 and a plurality of negative terminal legs 1052 extending from the annular negative terminal body 1051 in a direction towards the second electrical connector body 20. The annular negative terminal 105 may further has a peripheral rim 1053 peripherally extending from the annular negative terminal body 1051, wherein an external diameter of the peripheral rim 1053 is corresponding to an internal diameter of the insulating protective ring 102.

The first electrical connector body 10 further comprises a tubular ring 106 received in the insulating protective ring 102, wherein the annular negative terminal body 1051 is received in the tubular ring 106 so that the tubular ring 106 may protect the annular negative terminal body 1051. The tubular ring 106 and the annular negative terminal body 1051 are concentrically received in the insulating protective ring 102. The negative terminal legs 1052 of the annular negative terminal 105 are arranged to electrically connect to the second electrical connector body 20 through a connection hole 2107 formed thereon. The negative terminal legs 1052 are arranged to electrically connect to a negative terminal member 23 provided in the second electrical connector body 20.

The first electrical connector body 10 further comprises an annular positive terminal 107 arranged to receive within the annular negative terminal body 1051. The annular positive terminal 107 comprises an annular positive terminal body 1071 and a plurality of live terminal legs 1072 extending from the annular positive terminal body 1071 also in a direction towards the second electrical connector body 20. According to the preferred embodiment of the present invention, the annular negative terminal 105 and the annular positive terminal 107 are physically separated by the insulating spring 108 so as to prevent accidental contact and possible short circuit between the annular negative terminal 105 and the annular positive terminal 107. The insulating spring 108 is configured from electrically insulating material, such as plastic material or high-carbon steel material with insulating treatment. The annular positive terminal 107 is arranged to be electrically connect to the second electrical connector body 20 in such a manner that the annular positive terminal body 1071 may be connected to a connecting column 22 of the second electrical connector body 20, while the live terminal legs 1072 are arranged to penetrate through a connecting member 21 of the second electrical connector body 20 and electrically connect to a live terminal member 24 thereof.

The insulating spring 108 may be configured as a compression spring having one end portion mounted in the first positioning slot 1041 of the annular spring holder 104, and another end portion mounted in a second positioning slot 2109 of the second electrical connector body 20 when the first electrical connector body 10 is detachably attached to the second electrical connector body 20.

The first electrical connector body 10 further comprises a first negative terminal base 115, a first live terminal base 116, a first neutral terminal base 113, and a first connecting flange 114 provided on an outer side of the end plate 112, wherein the negative terminal connector 109 and the live terminal connector 110 are connected and supported on the first negative terminal base 115 and the first live terminal base 116 respectively.

Inside the receiving cavity 1029, the first longitudinal portion 1091 of the negative terminal connector 109 is arranged to bias against an inner surface of the annular negative terminal body 1051 of the annular negative terminal 105 so as to facilitate electrical connection between the negative terminal connector 109 and the annular negative terminal 105. On the other hand, the second longitudinal portion 1101 of the live terminal connector 110 is arranged to bias against an inner surface of the annular positive terminal body 1071 of the annular positive terminal 107 so as to facilitate electrical connection between the live terminal connector 110 and the annular positive terminal 107.

Referring to FIG. 4 to FIG. 7 of the drawings, the second electrical connector body 20 is detachably connected to the first electrical connector body 10 at the first opening 1031. The second electrical connector body 20 comprises a connecting member 21 and the connecting column 22 extending from the connecting member 21. The connecting member 21 and the connecting column 22 are both configured from electrically insulating material.

The second electrical connector body 20 further comprises a second negative terminal base 2104, a second live terminal base 2105 and a second neutral terminal base 2106 provided on an inner side (the side facing the first electrical connector body 10) of the connecting member 21. Moreover, the connecting member 21 further comprises a second connecting flange 2102, and have two holes 2107, 2108 formed on the connecting member 21, wherein the negative terminal legs 1052 of the annular negative terminal 105 and the live terminal legs 1072 of the annular positive terminal 107 are arranged to penetrate through the holes 2107, 2108 for electrically connecting to the second electrical connector body 20. The second connecting flange 2102 is arranged to be connected to the second outer connector 40.

The second electrical connector body 20 further comprises the negative terminal member 23, a live terminal member 24 and a neutral terminal member 25 provided on the second negative terminal base 2104, the second live terminal base 2105 and the second neutral terminal base 2106 respectively. Each of the negative terminal member 23 and the live terminal member 24 are configured to be a panel-like structure. The negative terminal member 23 has a first terminal hole 231 and the live terminal member 24 has a second terminal hole 241, wherein the first terminal hole 231 and the second terminal hole 241 are positioned corresponding to the two holes 2107, 2108 of the connecting member 21 respectively.

Thus, the negative terminal legs 1052 of the annular negative terminal 105 and the live terminal legs 1072 of the annular positive terminal 107 are arranged to penetrate through the holes 2107, 2108 and connect to the first terminal hole 241 and the second terminal hole 251 respectively for electrically connecting the first electrical connector body 10 to the second electrical connector body 20.

The neutral terminal member 25 is configured as having a panel-like structure and is mounted on the second neutral terminal base 2106 and electrically connected to a neutral conductive column 26 of the second electrical connector body 20. It is worth mentioning that the negative terminal member 23, the live terminal member 24 and the neutral terminal member 25 are physically separated by at least one blocking panel 2103 so as to prevent short circuit between the negative terminal member 23, the live terminal member 24 and the neutral terminal member 25.

As shown in FIG. 4 of the drawings, the neutral conductive column 26 is arranged to electrically connect to the neutral terminal member 25 and extend between the second neutral terminal base 2106 and the first neutral terminal base 113 of the first electrical connector body 10. The neutral conductive column 26 may also be electrically connected to ground.

As mentioned earlier, the connecting member 21 has a second positioning slot 2109 for securing a position of the insulating spring 108, and a third positioning slot 2110 indently formed thereon. Each of the second positioning slot 2109 and the third positioning slot 2110 has a circular cross section and may form along a circumferential direction of the connecting member 21, which also has a circular cross section when viewed from the direction of the first electrical connector body 10. Thus, the second positioning slot 2109 and the third positioning slot 2110 may concentrically formed on the connecting member 21. The third positioning slot 2110 is arranged to secure the position of the annular negative terminal 105.

Moreover, the connecting column 22 of the second electrical connector body 20 is integrally extended from the connecting member 21 in the direction of the first electrical connector body 10. The connecting column 22 further has a conductive hole 221 longitudinally formed thereon for receiving the neutral conductive column 26. The neutral conductive column 26 is arranged to extend between the connecting column 22, wherein one end of the neutral conductive column 26 is connected to the neutral terminal member 25, while another end of the neutral conductive column 26 is electrically connected to the power source.

The connecting column 22 further has a securing slot 222 for securing a position of the annular positive terminal 107. When the first electrical connector body 10 is detachably connected to the second electrical connector body 20, the annular positive terminal body 1071 is arranged to be secured by the securing slot 222 of the connecting column 22.

As shown in FIG. 4 to FIG. 6 of the drawings, the first electrical connector body 10 and the second electrical connector body 20 may detachably connect to each other with the insulating protective ring 102 positioned in between.

Referring to FIG. 1 to FIG. 6 of the drawings, the first outer connector 30 is configured from electrically insulating material and is connected to the first electrical connector body 10. The first outer connector 30 may be on a Christmas tree, such as a branch portion of an artificial Christmas tree.

According to the preferred embodiment of the present invention, the first outer connector 30 may be configured to have a substantially tubular structure corresponding to that of the first electrical connector body 10. The first outer connector 30 has a first tubular body 30A and a second tubular body 30B. The first tubular body 30A and the second tubular body 30B are connected to form the substantially tubular structure of the first outer connector 30. The connection between the first tubular body 30A and the second tubular body 30B may be accomplished through screws and a first threaded hole 34 provided on the second tubular body 30B. The first outer connector 30 is arranged to be detachably mounted on the artificial Christmas tree through a first mounting slot 31 and a first mounting hole 32. The first outer connector 30 is connected to the first electrical connector body 10 through mounting on the first connecting flanges 114. Moreover, the first outer connector 30 has a first protective opening 301 and a third connecting rim 33 formed around the first protective opening 301, wherein the third connecting rim 33 is arranged to engage with the first connecting rim 111 when the first outer connector 30 is connected to the first electrical connector body 10.

Referring to FIG. 1 to FIG. 6 of the drawings, the second outer connector 40 may also be configured to have a substantially tubular structure corresponding to that of the second electrical connector body 20. The second outer connector 40 has a third tubular body 40A and a fourth tubular body 40B. The third tubular body 40A and the fourth tubular body 40B are connected to form the substantially tubular structure of the second outer connector 40. The connection between the third tubular body 40A and the fourth tubular body 40B may be accomplished through screws and a second threaded hole 44 provided on the fourth tubular body 40B. The second outer connector 40 is arranged to be detachably mounted on the artificial Christmas tree through a second mounting slot 41 and a second mounting hole 42. The second outer connector 40 has a second protective opening 401 and a fourth connecting rim 43 formed around the second protective opening 401, wherein the fourth connecting rim 43 is arranged to engage with the second connecting rim 211 when the second outer connector 40 is connected to the second electrical connector body 20. Moreover, the second outer connector 40 may be connected to the second electrical connector body 20 through connecting to the second connecting flange 2102 of the second electrical connector body 20.

Referring to FIG. 1 and FIG. 5 of the drawings, the first protective cover 30 further has a first wiring hole while the second protective cover 40 further has a second wiring hole, wherein power supply wires are arranged to be inserted into the first protective cover 30 and the second protective cover 40 through the first wiring hole and the second wiring hole. The power supply wires are electrically connected to the negative terminal connector 109, the live terminal connector 110 of the first electrical connector body 10, and the neutral conductive column 26 of the second electrical connector body 20.

The operation of the present invention is as follows: a user may first connect the first tubular body 30A to the second tubular body 30B to form an integral first outer connector 30. Similarly, the user may also connect the third tubular body 40A to the fourth tubular body 40B to form an integral second outer connector 40. After that, the first outer connector 30 may be connected to the first electrical connector body 10 through engaging the third connecting rim 33 with the first connecting rim 111. The second outer connector 40 may be connected to the second electrical connector body 20 through engaging the fourth connecting rim 43 with the second connecting rim 211 to form the electrical connector 100 of the present invention.

The electrical connector 100 of the present invention may be mounted in a tubular structure (such as a branch) of an artificial Christmas tree for supplying power to the relevant lighting devices. When some electrical components are out of order, a user may conveniently detach the relevant electrical connector 100 from the artificial Christmas tree and perform the necessary repair. After that the electrical connector 100 may be mounted back to the artificial Christmas tree.

The present invention, while illustrated and described in terms of a preferred embodiment and several alternatives, is not limited to the particular description contained in this specification. Additional alternative or equivalent components could also be used to practice the present invention.

What is claimed is:

1. An electrical connector for a Christmas tree having a hollow tube structure, comprising: a first electrical connector body having an outer wall, a receiving cavity and an end plate to form a substantially tubular structure, and comprising: an insulating isolation ring provided in said receiving cavity of said first electrical connector body; a negative terminal connector and a live terminal connector mounted on said end plate of the first electrical connector body; an insulating protective ring mounted in said receiving cavity at a position between said outer wall of said first electrical connector body and said insulating isolation ring; an annular negative terminal received in said receiving cavity of said first electrical connector body; an annular spring holder having a first positioning slot; an insulating spring having one end secured in said first positioning slot of said annular spring holder, said insulating spring accommodating in said annular negative terminal; and an annular positive terminal received in said annular negative terminal and physically separated by said insulating spring in said annular negative terminal; a second electrical connector body detachably connected to said first electrical connector body at a first opening thereof, said second electrical connector body comprising: a connecting member; a connecting column extending from said connecting member, said connecting column having a securing slot and a conductive hole; a negative terminal member mounted on said connecting member; a live terminal member mounted on said connecting member; a neutral terminal member provided on said connecting member; a neutral conductive column secured in said conductive hole and electrically connected to said neutral terminal member; a first outer connector connected to said first electrical connector body at a position opposite to said second electrical connector body; and a second outer connector connected to said second electrical connector body at a position opposite to said first electrical connector body, said second outer connector connecting to said Christmas tree, wherein when said first electrical connector body is detachably connected to said second electrical connector body, said negative terminal connector and said live terminal connector of said first electrical connector body are arranged to electrically connect to said annular negative terminal and annular positive terminal respectively, the other end of the annular negative terminal and annular positive terminal are connected to the negative terminal member and said live terminal member of said second electrical connector body respectively, one end of the neutral conductive column is connected to the neutral terminal member of the second electrical connector body, and its other end penetrates out of the first electrical connector, and this end is grounded.

2. The electrical connector, as recited in claim 1, wherein said insulating isolation ring integrally extends from said end plate toward said first opening, said insulating isolation ring having a tubular structure and a circular cross sectional shape, said outer wall of said first electrical connector body and said insulating isolation ring being concentrically and spacedly arranged in said receiving cavity.

3. The electrical connector, as recited in claim 2, wherein said insulating isolation ring has a first guiding slot and a second guiding slot formed on an inner surface and an outer surface of said insulating isolation ring at two opposite sides thereof respectively, said negative terminal connector and said live terminal connector are mounted on said first guiding slot and said second guiding slot respectively.

4. The electrical connector, as recited in claim 3, wherein said negative terminal connector has a first longitudinal portion and a first transverse portion to form a L-shaped structure, wherein said first longitudinal portion is mounted on said first guiding slot and penetrate through said end plate, so that said first transverse portion is mounted on an outer surface of said end plate.

5. The electrical connector, as recited in claim 4, wherein said live terminal connector has a second longitudinal portion and a second transverse portion to form a L-shaped structure, wherein said second longitudinal portion is mounted on said second guiding slot and penetrate through said end plate, so that said second transverse portion is mounted on said outer surface of said end plate.

6. The electrical connector, as recited in claim 5, wherein said insulating protective ring has a peripheral rim portion and a main portion extending from said peripheral rim portion, said peripheral rim portion is mounted on said first opening of said first electrical connector body, while said main portion extends in said receiving cavity toward said end plate, said insulating protective ring being configured from electrically insulating material and provide shock protection for said negative terminal connector and said live terminal connector.

7. The electrical connector, as recited in claim 6, wherein said annular negative terminal is configured from electrically conductive material and comprise an annular negative terminal body and a plurality of negative terminal legs extending from said annular negative terminal body in a direction towards said second electrical connector body, said annular negative terminal further has a peripheral rim peripherally extending from said terminal ring body, wherein an external diameter of said peripheral rim is corresponding to an internal diameter of said insulating protective ring.

8. The electrical connector, as recited in claim 7, wherein said first electrical connector body further comprises a tubular ring received in said insulating protective ring, wherein said terminal ring body is received in said tubular ring so that said tubular ring is arranged to protect said annular negative terminal body, said tubular ring and said annular negative terminal body are concentrically received in said insulating protective ring, said negative terminal legs of said annular negative terminal being arranged to electrically connect to said negative terminal member second electrical connector body when said first electrical connector body is detachably attached on said second electrical connector body.

9. The electrical connector, as recited in claim 8, wherein said annular positive terminal comprises an annular positive terminal body and a plurality of live terminal legs extending from said annular positive terminal body in a direction towards said second electrical connector body to electrically connect to said live terminal member second electrical connector body when said first electrical connector body is detachably attached on said second electrical connector body.

10. The electrical connector, as recited in claim 9, wherein said connecting member further has a second positioning slot, said insulating spring having one end portion mounted in said first positioning slot of said annular spring holder, and another end portion mounted in a second positioning slot of said connecting member of said second electrical connector body when said first electrical connector body is detachably attached to said second electrical connector body.

11. The electrical connector, as recited in claim 10, wherein said first electrical connector body further comprises a first negative terminal base, a first live terminal base, a first neutral terminal base, and a first connecting flange provided on an outer side of said end plate, wherein said negative terminal connector and said live terminal connector are connected and supported on said first negative terminal base and said first live terminal base respectively.

12. The electrical connector, as recited in claim 11, wherein said first longitudinal portion of said negative terminal connector is arranged to bias against an inner surface of said annular negative terminal body of said annular negative terminal so as to facilitate electrical connection between said negative terminal connector and said annular negative terminal, said second longitudinal portion of said live terminal connector being arranged to bias against an inner surface of said annular positive terminal body of said annular negative terminal so as to facilitate electrical connection between said live terminal connector and said annular positive terminal.

13. The electrical connector, as recited in claim 12, wherein said second electrical connector body further comprises a second negative terminal base, a second live terminal base, a second neutral terminal base provided on an inner side of said connecting member, wherein said negative terminal member, said live terminal member and said neutral terminal member are provided on said second negative terminal base, said second live terminal base and said second neutral terminal base respectively.

14. The electrical connector, as recited in claim 13, wherein said second electrical connector body further comprises a blocking member for physically separating said negative terminal member, said live terminal member and said neutral terminal member so as to prevent short circuit between said negative terminal member, said live terminal member and said neutral terminal member.

15. The electrical connector, as recited in claim 14, wherein said connecting member further having a third positioning slot, wherein each of said second positioning slot and said third positioning slot has a circular cross section and is concentrically formed on said connecting member 21, said third positioning slot being arranged to secure a position of said annular negative terminal when said second electrical connector body is detachably connected to said first electrical connector body.

16. The electrical connector, as recited in claim 15, wherein said connecting column has a securing slot formed thereon for securing a position of said annular positive terminal when said first electrical connector body is detachably connected to said second electrical connector body.

17. The electrical connector, as recited in claim 1, wherein said first outer connector has a first tubular body and a second tubular body connected to said first tubular body to form a substantially tubular structure of said first outer connector, said first electrical connector body further comprising a first connecting flange, wherein said first outer connector is connected to said first electrical connector body through mounting on said first connecting flange.

18. The electrical connector, as recited in claim 16, wherein said first outer connector has a first tubular body and a second tubular body connected to said first tubular body to form a substantially tubular structure of said first outer connector, said first electrical connector body further comprising a first connecting flange, wherein said first outer connector is connected to said first electrical connector body through mounting on said first connecting flange.

19. The electrical connector, as recited in claim 17, wherein said second outer connector comprises a third tubular body and a fourth tubular body connected to said third tubular body to form a substantially tubular structure of said second outer connector, said second electrical connector body further comprising a second connecting flange, wherein said second outer connector is connected to said second electrical connector body through mounting on said second connecting flange.

20. The electrical connector, as recited in claim 18, wherein said second outer connector comprises a third tubular body and a fourth tubular body connected to said third tubular body to form a substantially tubular structure of said second outer connector, said second electrical connector body further comprising a second connecting flange, wherein said second outer connector is connected to said second electrical connector body through mounting on said second connecting flange.

* * * * *